July 5, 1966  A. F. HULVERSON ETAL  3,259,364
SCREW ACTUATED SEMITRAILER SUPPORT LEG
Filed Dec. 24, 1963  2 Sheets-Sheet 1
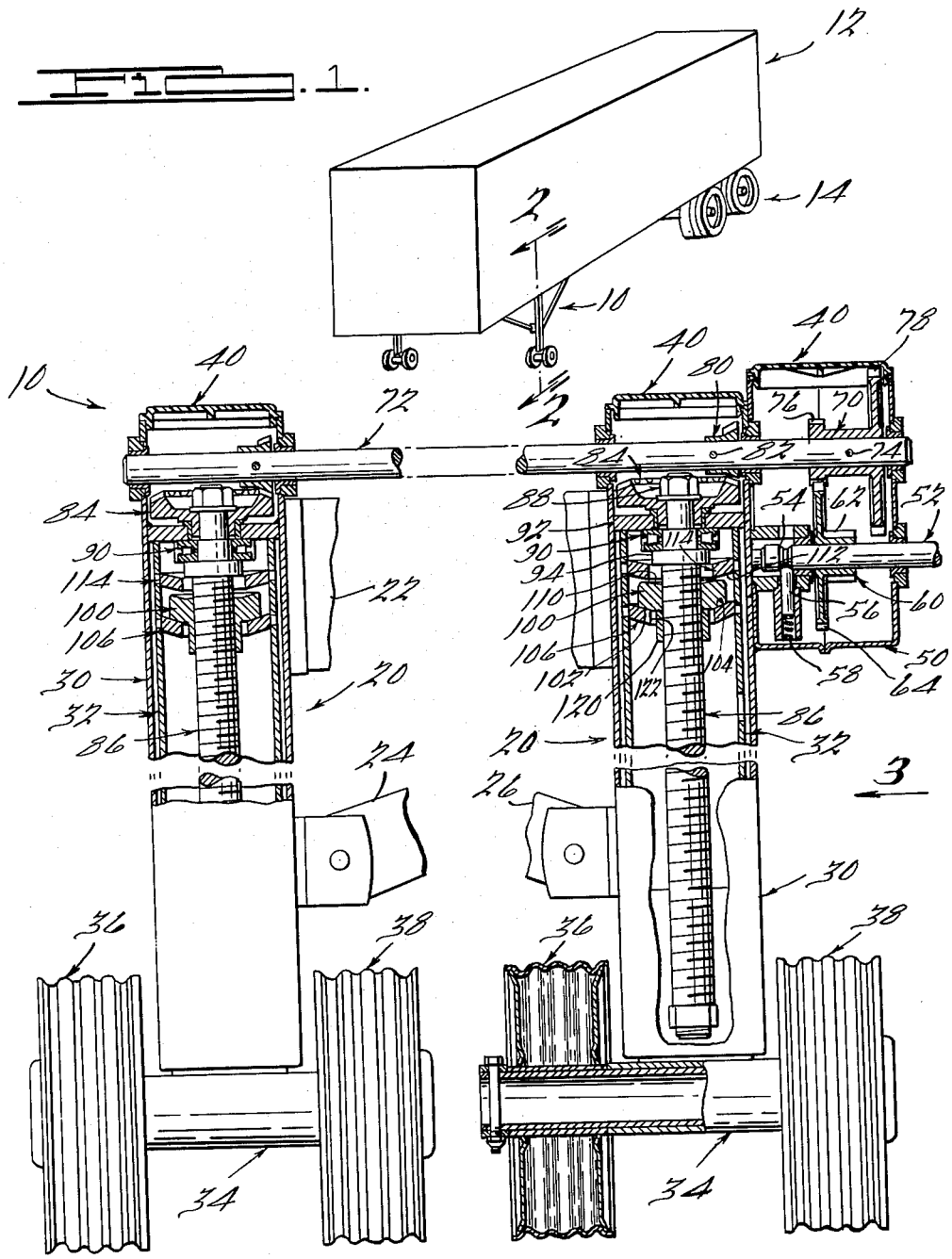
INVENTORS.
Adrian F. Hulverson.
Ralph N. Tozer.
BY
Harness, Dickey & Pierce
ATTORNEYS July 5, 1966  A. F. HULVERSON ETAL  3,259,364
SCREW ACTUATED SEMITRAILER SUPPORT LEG
Filed Dec. 24, 1963  2 Sheets-Sheet 2
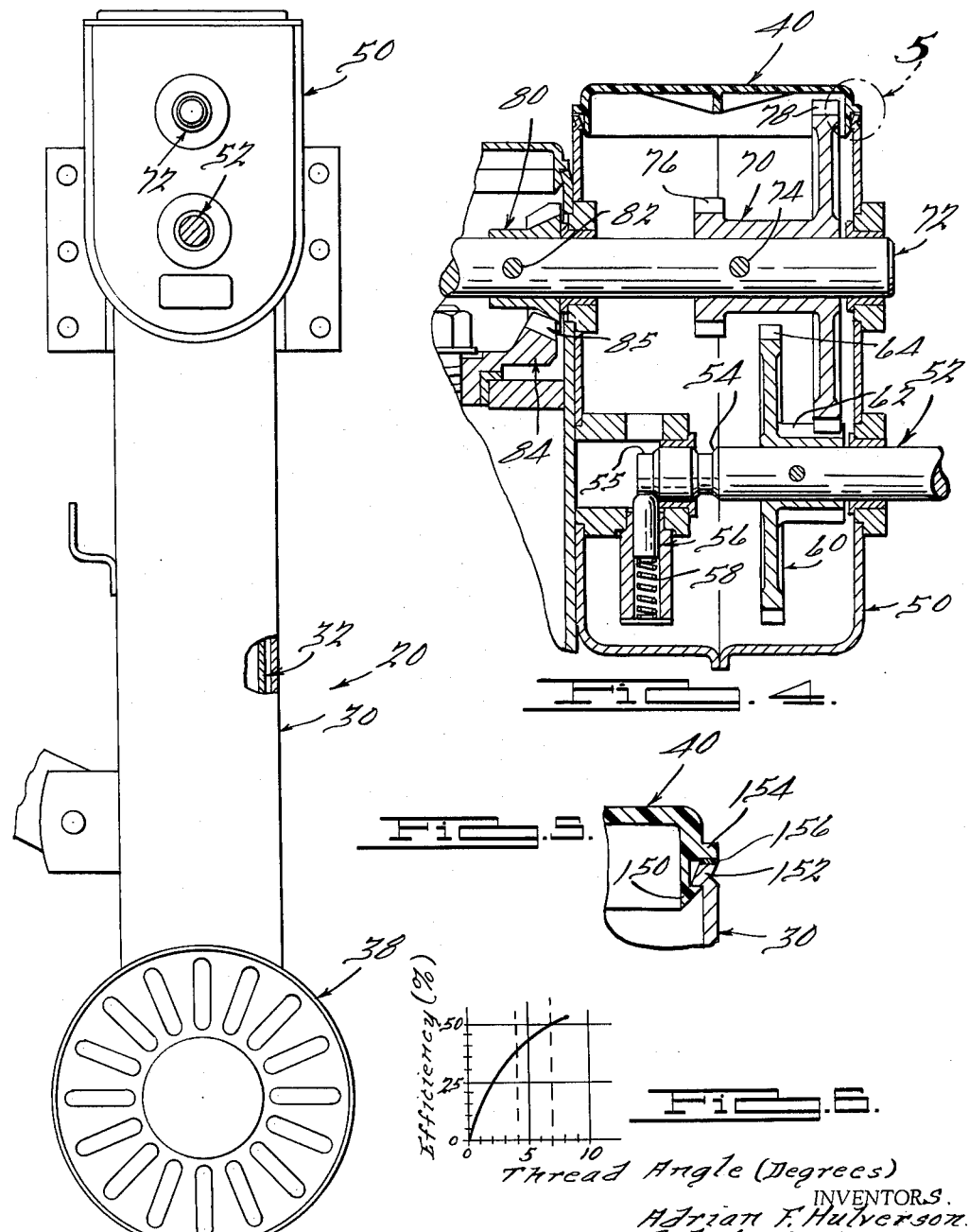
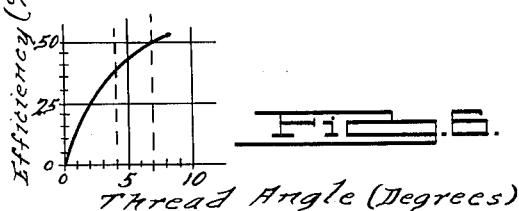
INVENTORS.
Adrian F. Hulverson.
Ralph N. Tozer.
BY
Harness, Dickey & Pierce
ATTORNEYS.

United States Patent Office 3,259,364
Patented July 5, 1966

3,259,364
SCREW ACTUATED SEMITRAILER SUPPORT LEG
Adrian F. Hulverson, Grosse Pointe Woods, and Ralph N. Tozer, Detroit, Mich., assignors to Fruehauf Corporation, Detroit, Mich., a corporation of Michigan
Filed Dec. 24, 1963, Ser. No. 333,151
1 Claim. (Cl. 254—86)

This invention relates generally to shipping apparatus and more particularly to an improved support leg assembly for heavy duty over-the-road semitrailers.

There has long been a need for an improved support leg assembly for semitrailers that maximizes the ease of raising or lowering the leg assembly relative to the trailer body commensurate with speed of such movement. Lead screws having a high helix angle maximize efficiency and the speed of operation but require a high torque input. Furthermore, such lead screws are not inherently self-locking and therefore are subject to kickback when the load of the trailer is placed on the support legs. The use of relatively high gear ratios, while minimizing the effort required to effect raising and lowering of the support leg assembly, increases the number of turns and therefore the time required to raise or lower the support leg assembly.

The foregoing problem is solved, in accordance with the instant invention by utilizing a lead screw having a relatively large helix angle such that it is barely self-locking. Since such a screw requires a relatively high torque input a suitable gear train is utilized to effect a high torque input. Because the gear train is relatively efficient, for example, 90% efficient, the total efficiency of the support leg is relatively high.

Accordingly, one object of the instant invention is an improved lead screw and gear train relationship for a support leg.

Another problem found in support legs heretofore known and used is that the lower portion of the leg flexes relative to the upper portion thereof when the support legs carry the load of the semitrailer. Thus, because the screw is loaded in compression it also is subject to flexure if the bearing structure therefore does not accommodate the distortion in the telescoping sections of the support legs.

This problem is solved, in accordance with yet another feature of the instant invention, by mounting the lead screw for the support legs in a novel spherical bearing so that the screw is loaded substantially in compression as opposed to being subjected to flexure.

Accordingly, another object of the instant invention is an improved bearing assembly for the screw of a support leg.

Yet another object of the instant invention is an improved plastic cover for the upper end of a support leg.

Other objects and advantages of the instant invention will be apparent in the following specification, claim and drawings, wherein:

FIGURE 1 is a perspective view of a heavy duty over-the-road semitrailer having the improved support leg assembly of the instant invention;

FIG. 2 is a cross sectional view taken substantially along the line 2—2 of FIG. 1;

FIG. 3 is a view taken in the direction of the arrow 3 of FIG. 2;

FIG. 4 is an enlarged fragmentary view of the gear box in the low speed condition;

FIG. 5 is an enlarged fragmentary view taken within the circle 5 of FIG. 4; and

FIG. 6 is a graph of screw efficiency vs. thread angle.

As best seen in FIGURE 1 of the drawings, an improved landing gear or support leg assembly 10 of the instant invention is shown in operative association with a heavy duty semitrailer 12. The trailer 12 is provided with a conventional wheel suspension 14 and is of conventional construction in all respects other than the support leg 10. The support leg assembly 10 comprises a pair of vertically extendable support legs 20 of like construction except for right and left hand orientation. Accordingly, only one of the legs 20 will be described in detail it being understood that like components are utilized in each of the legs 20 and to which like numbers have been applied.

The legs 20 are joined by a transverse bolster 22, and a pair of transverse tierods 24 and 26. Each leg 20 comprises an outer sleeve 30 of substantially square transverse cross section within which an inner sleeve 32 of complementary square transverse cross section is telescopically received. A horizontal axle 34 is secured to the lower end of the inner sleeve 32 as by welding for the support of a pair of ground-engaging wheels 36 and 38. A plastic cap 40, more particularly described hereinafter, closes the upper end portion of the outer sleeve 30 to preclude the infiltration of debris and other foreign materials thereinto.

As best seen in FIGURES 2 and 4 of the drawings, a transmission housing 50 is secured to one of the legs 20, as by welding for the support of a manually rotatable crankshaft 52. The crankshaft 52 has a pair of annular grooves 54 and 55 therein for the acceptance of a complementary detent member 56, selectively. The detent member 56 is biased against the crankshaft 52 by a spring 58 thereby to longitudinally position the crankshaft 52 relative to the housing 50.

The crankshaft 52 is provided with a cluster gear 60 having an 11 tooth portion 62 and a 39 tooth portion 64, which effect low and high speed elevation, respectively, of the support legs 20, as will be described.

The cluster gear 60 cooperates with a main shaft cluster gear 70 which is rotatably secured to a main shaft 72 as by a pin 74. The main shaft cluster gear 70 has a 16 tooth section 76 and a 44 tooth section 78 which cooperate with the 39 and 11 tooth sections 64 and 62 of the crankshaft cluster gear 60, respectively. Thus, it should be apparent that axial movement of the crankshaft 52 to the position shown in FIGURE 2 of the drawings effects relatively high speed rotation of the main shaft 72. Conversely, axial movement of the crankshaft 52 to the right as seen in FIGURE 4 of the drawings, brings the 11 tooth portion 62 of the crankshaft cluster gear 60 into engagement with the 44 tooth portion 78 of the main shaft cluster gear 70 thereby to effect low speed drive of the main shaft 72.

A bevel gear 80 having a 14 tooth section 81 is secured to the main shaft 72 as by a pin 82 so as to cooperate with a bevel gear 84 having a 30 tooth section 85. The bevel gear 84 is secured to a vertically extending lead screw 86, which, in accordance with one feature of the instant invention, is a self-locking, 1⅜ by 4½ double thread screw having a helix angle of 5°55′.

From an analysis of the foregoing gear and screw specification it should be apparent that the support leg assembly of the instant invention optimizes the relationship between the screw and the gear train to achieve a relatively high overall operating efficiency. For example, currently known and used support leg assemblies require 4.7 revolutions of the manually rotatable crankshaft for 1 inch of lift at high speed, low torque operation, and 23.8 revolutions of the crankshaft for low speed, high torque elevation of the support legs. Presently known support legs are capable of lifting 24,000 pounds with a 100 pound force on a standard crankhandle or stated in another manner, a 105 pound force is required on a standard crankhandle to lift a 25,000 pound load.

The foregoing data is to be contrasted to the performance characteristics of the support leg of the instant invention. The support leg of the instant invention requires only 2 revolutions of the handle per inch of lift in the high speed condition. Furthermore, the support leg of the instant invention requires only 19.3 revolutions of the crankhandle to effect one inch of lift in the low speed condition. A 100 pound force on a standard crank will effect elevation of 38,500 pounds or, in other words, the force requirement to effect elevation of a 25,000 pound load is 65 pounds on the crankhandle. This is to be contrasted to the 105 pound force of currently known and used support legs.

Vertical loads on the lead screw 86 are transferred between the screw 86 and the outer sleeve 30 of the support leg 20 by a thrust bearing 90 which is seated against a transverse plate 92 at the upper end of the outer sleeve 30. A collar 94 on the screw 86 engages the lower side of the bearing 90.

In accordance with one feature of the instant invention, vertical loads on the lower sleeve 32 are transferred to the screw 86 by a threaded nut 100 complementary to the lead screw 86. The nut 100 has a spherical surface 102 that is seated on a complementary spherical seating surface 104 on a lower nut retainer plate 106. The plate 106 is secured to the inner sleeve 32 as by welding.

Similarly, a spherical surface 110 on the nut 100 is engageable by a complementary spherical surface 102 on an upper retainer plate 104 which is secured to the inner leg 32 as by welding.

Relative rotation between the nut 100 and the inner leg 32 is precluded by a generally square lower skirt portion 120 on the nut 100 that is acceptable in a complementary square aperture 122 in the lower retainer plate 106.

From the foregoing description it should be apparent that when the inner leg portion 32 is fully extended downwardly relative to the outer leg portion 30, at which time the nut 100 is at the lower end portion of the screw 86, distortion or flexure between the leg portions 30 and 32 is not transmitted to the screw 86 because the nut 100 is relatively free to move laterally relative to the inner leg 32 on its spherical seat. Thus, the lead screw is always loaded substantially axially thereof minimizing failure of the lead screw and resistance to rotation thereof relative to the nut 100.

As best seen in FIGURE 5 of the drawings, the leg cap 40 has a lower lip portion 150 of gooseneck configuration that is complementary to an embossed portion 152 on the outer leg 30 so as to be engageable thereunder to lock the cap 40 onto the leg 20. Cap 40 also has a laterally extending lip portion 154 that is seated on an upper surface 156 of the leg 30 to effect a seal therewith. The surface 156 comprises an epoxy resin that bonds to the leg portion 30 but does not bond to the cap 40. The epoxy is placed on the upper edge of the leg 30 prior to application of the cap 40. When the cap 40 is applied, the epoxy is compressed to form a seat complementary to the lip 154 on the cap. In this manner precise machining of the upper edge face of the outer leg 32 is eliminated.

As seen in FIGURE 6 of the drawings, a graph of screw efficiency vs. thread angle for a given friction factor due to lubrication characteristics, finish, etc., shows that to achieve an efficiency in the vicinity of 50% the thread angle of the screw should be in the range of 4 to 7 degrees. The upper limit of approximately 7° of thread angle or an efficiency of less than 50% is dictated by the requirement that the screw be irreversible or, in other words, that the load of the trailer be incapable of effecting reversal of the lead screw and collapse of the support leg. At the other extreme it is desirable that the helix angle of the lead screw be at least 4° so as to maximize total efficiency of the support leg. Thus, it should be apparent a lead screw of 5°5' as specified hereinbefore will exhibit optimum performance characteristics. This is to be compared to the lead screws of support legs heretofore known and used which utilize screws with a helix angle of, 2° or less.

It is to be understood that the specific construction of the improved support leg herein disclosed and described is presented for the purpose of explanation and illustration and is not intended to indicate the limits of the invention, the scope of which is defined by the following claim.

What is claimed is:

A support leg assembly for a heavy duty over-the-road semitrailer comprising an upper sleeve, a lower sleeve telescoped within said upper sleeve, a nut retainer having a transverse generally spherical upwardly facing seating face and a generally rectangular central aperture therein secured to an upper end portion of said lower sleeve, a nut having a generally spherical lower face seated on the seating face of said nut retainer and a generally square skirt portion extending through the aperture in said retainer, a lead screw having a helix angle of 4 to 7 degrees threadably engaged with said nut and supported for rotation by an upper end portion of said upper sleeve whereby rotation of said screw effects longitudinal movement of said nut and inner sleeve relative to the outer sleeve, a crankshaft at the upper end of said outer sleeve, and a gear train having a relatively low speed high torque output drivably connected between said crankshaft and said lead screw.

References Cited by the Examiner

UNITED STATES PATENTS

| | | | |
|---|---|---|---|
| 2,546,672 | 3/1951 | LeClair. | |
| 2,663,542 | 12/1953 | Lincoln et al. | 74—424.8 X |
| 3,002,400 | 10/1961 | Scott | 74—424.8 X |
| 3,010,699 | 11/1961 | McKay | 254—86 |
| 3,023,925 | 3/1962 | Sher | 220—60 |
| 3,071,800 | 1/1963 | Patriquin | 200—60 X |
| 3,081,065 | 3/1963 | Dalton | 254—86 |
| 3,128,900 | 4/1964 | Chaboche | 220—60 |

EDWARD C. ALLEN, *Primary Examiner.*

MILTON S. MEHR, WILLIAM FELDMAN, *Examiners.*

O. M. SIMPSON, *Assistant Examiner.*